United States Patent [19]
Kollross

[11] Patent Number: 5,088,956
[45] Date of Patent: Feb. 18, 1992

[54] METHOD AND DEVICE FOR THE FORMATION OF AN END CLOSURE ON A HOSE-TYPE PACKING WRAPPER

[76] Inventor: Günter Kollross, Am Wallerstädter Weg 20, W-6080 Gross Gerau-Dornheim, Fed. Rep. of Germany

[21] Appl. No.: 694,303

[22] Filed: May 2, 1991

[51] Int. Cl.$^5$ .................. A22C 13/00; A22C 11/12
[52] U.S. Cl. ............................. 452/32; 452/21; 426/140; 138/118.1
[58] Field of Search ............ 452/32, 21, 26; 426/140, 138; 53/483; 138/118.1

[56] References Cited

U.S. PATENT DOCUMENTS

| | | | |
|---|---|---|---|
| 3,794,268 | 2/1974 | McNeil | 452/32 |
| 3,882,252 | 5/1975 | Winkler | 426/140 |
| 4,411,048 | 10/1983 | Green | 426/140 |
| 4,525,984 | 7/1985 | Kollross | 452/21 |
| 4,873,748 | 10/1989 | Enyan et al. | 452/21 |

FOREIGN PATENT DOCUMENTS

| | | |
|---|---|---|
| 3248761 | 7/1984 | Fed. Rep. of Germany ... 138/118.1 |
| 3405445 | 5/1985 | Fed. Rep. of Germany ........ 452/32 |

Primary Examiner—Willis Little
Attorney, Agent, or Firm—Larson & Taylor

[57] ABSTRACT

A method and apparatus are disclosed for forming a vent hole in an end closure in the form of a twisted plait on a hose-type packing wrapper, especially a sausage skin, shirred to form a caterpillar with an unshirred wrapper section (34). A first elongated winding element (46) is introduced into the packing wrapper 940) to behind the first shirring folds. Subsequently, the unshirred wrapper section (34) is seized along an axial surface line by a second elongated winding element (48) of a length shorter than that of the first winding element (46) which is moved radially towards the latter. Thereupon, the winding elements (46, 48) are actuated in rotating manner and, at the same time, are axially advanced. The twisted plait is thus generated from the free end of the winding elements (46, 48) in a manner progressing to the rear. At the end, by retraction of the winding elements (46, 48), a vent channel or hole remains in the twisted plait.

18 Claims, 11 Drawing Sheets

METHOD AND DEVICE FOR THE FORMATION OF AN END CLOSURE ON A HOSE-TYPE PACKING WRAPPER

FIELD OF THE INVENTION

The present invention is concerned with a method for forming an end closure in the form of a twisted plait on a hose-type packing wrapper, especially sausage skin, shirred to form a caterpillar. With the present invention, a first elongated winding element is guided into the interior of the packing wrapper to behind the first shirring folds. The outermost wrapper section is then seized between the first and a second elongated winding element along an axial surface line. Next, the winding elements, which are used for forming the twisted plaint, are rotated within the packing wrapper and relative thereto about the longitudinal axis thereof. At the same time, the winding elements are axially advanced and, upon termination of the turning movement, withdrawn from the twisted plait.

BACKGROUND OF THE INVENTION

Hose-type packing wrappers shirred to form caterpillars of the type as described hereinbefore are being widely used, especially in sausage fabrication, on automatic filling machines. By previously closing a wrapper end, it is possible, after mounting the packing wrapper onto the loading tube, to immediately commence the filling operation. However, it is desirable to vent the packing wrapper at the closed end to prevent air pads from being formed. An end closure of a twisted plait-type configuration containing a venting channel is suitably used for that purpose.

According to a state-of-the-art method for forming an end closure of this type (DE-OS 23 17 867), a plurality of key-shaped plates are provided in radial planes on the front-sided end of a rotatingly drivable cylindrical tool carrier. Front edges of the tool carrier are disposed on a conical surface and the shaped plates are forced against the front-sided end of the shirred packing wrapper, thereby exerting a circumferential force on the hose type wrapper material as used therein. This progressively draws out the ultimate folds of the shirred packing wrapper within the latter, twisting them about an elongated thin shaping element projecting into the packing wrapper to form a closely twisted knot of hose-type wrapper material about the shaping element. However, it is not indicated how to proceed to reach this goal by the means shown and described.

In another conventional method according to DE-PS 34 05 445, the front-sided end of a caterpillar is twisted in relation to the remainder by means of a pair of tongs, thereby providing a tight closure with no vent orifice.

According to another conventional method for forming an end closure in the form of a twisted plaint within a packing wrapper shirred in caterpillar-type manner (U.S. Pat. No. 4,536,175), a rotatingly actuable shaft carries two axially parallel gripper claws of different length between which is manually introduced the end of the packing wrapper after drawing out the ultimate folds. The gripper is then pushed into the packing wrapper. After that, a non-rotating buffer with the conical front side thereof is placed against the end of the packing wrapper, with the gripper claws being rotated to form a twisted plait. The description and illustration of the method and the device for carrying out the method do not teach how the desired venting channel is formed in the twisted plait.

Finally, a method of providing an end closure in the form of a twisted plait containing a vent channel on a packing wrapper shirred in caterpillar-type manner is taught by DE-OS 31 41 782. This method is being widely used in the art, as opposed to the afore-described method. According to this method an elongated shaping element from the rear side is guided throughout the packing wrapper, and the ultimate folds of the packing wrapper are twisted about the shaping element through externally seizing and rotatingly actuated clamping jaws. The twisting plait thereby formed externally of the packing wrapper is then forced into the packing wrapper through a sleeve-type element. Although a faultless end closure containing the desired vent channel is attained in this manner, the method as used, in view of the additional measure of forcing the twisted plait into the shirred packing wrapper, is complex and time-consuming. In addition, execution thereof involves substantial space requirements and considerable mechanical efforts.

SUMMARY OF THE INVENTION

It is the object of the invention to provide a method of the afore-described type for forming an end closure containing a vent channel on a packing wrapper shirred to form a caterpillar which insures the formation of a safe end closure of this type and which involves few process steps, relatively low structural efforts and moderate space requirements.

The problem, in the practice of the invention, is solved in that an unshirred wrapper section is formed on the end of the packing wrapper to be closed. This section, along the axial surface line and by means of the second winding element of reduced length compared to the first winding element, is guided thereto from the outside. The winding elements, during the rotating movement, are advanced thereby forming the twisted plait within the wrapper in a manner progressing from the free end of the winding elements to the rear. Then, the withdrawal of the winding element of greater length forms the hole (exposes a vent channel) in the packing wrapper constricted by the twisting step.

Tests have shown that this method provides a packing wrapper having an end closure in the form of a twisted plait provided with a vent channel. The packing wrapper is formed, being immediately ready for use, reliably withstands the filling pressure, especially in the sausage production, and prevents air pads in the filled package wrapper from being generated thanks to the faultlessly formed vent channel.

According to another feature for the advantageous development of the process according to the invention, the rotating movement of the winding elements starts while the unshirred wrapper section is seized and guided to the first winding element, thereby attaining a soft engagement between the outer winding element and the wrapper material. Compared therewith, the axial advance of the winding elements is initiated only after the unshirred wrapper section has been guided to the first winding element and once the material at the end of the winding element of reduced length has already been twisted.

Still another feature for the advantageous development of the method according to the invention resides in that the unshirred wrapper section is formed during shirring by starting the fold laying at a space from the front-sided end of the wrapper material to be shirred. This eliminates special measures for drawing out and smoothing of folds already formed.

A device is also provided for carrying out the new process after the unshirred wrapper section has already been formed and the packing wrapper is held ahead of the device against rotation and axial displacement. This device includes a holding means for the caterpillar and a rotatingly actuable shaft-type tool carrier displaceable in controlled manner in relation to the holding means. A pair of tongs are arranged at the end of the tool carrier, facing the holding means. According to the invention, the pair of tongs has two legs of different length. The leg of greater length is rigidly connected to the tool carrier and is substantially in alignment with the axis of rotation thereof, while the leg of reduced length is movable radially toward the leg of greater length. Then, for forming the twisted plait in a manner progressing from the free end of the legs to the rear, the tool carrier with the closed tongs is rotatable and simultaneously axially movable.

BRIEF DESCRIPTION OF THE DRAWINGS

The method of the invention and a preferred form of embodiment of a device for forming the twisted plait according to that method will now be described in closer detail in conjunction with the drawings, wherein FIGS. 1 to 4 schematically show perspective views of four successive typical states during shirring of a hose-type wrapper strand to form a caterpillar-type packing skin which is finally cut from the strand and seized by a holding means.

DETAILED DESCRIPTION OF THE PREFERRED EMBODIMENT

Figure 1:
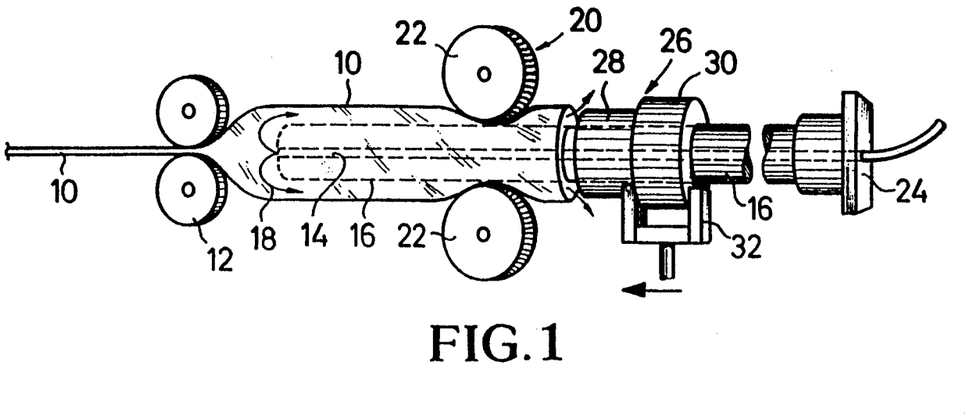
Figure 2:
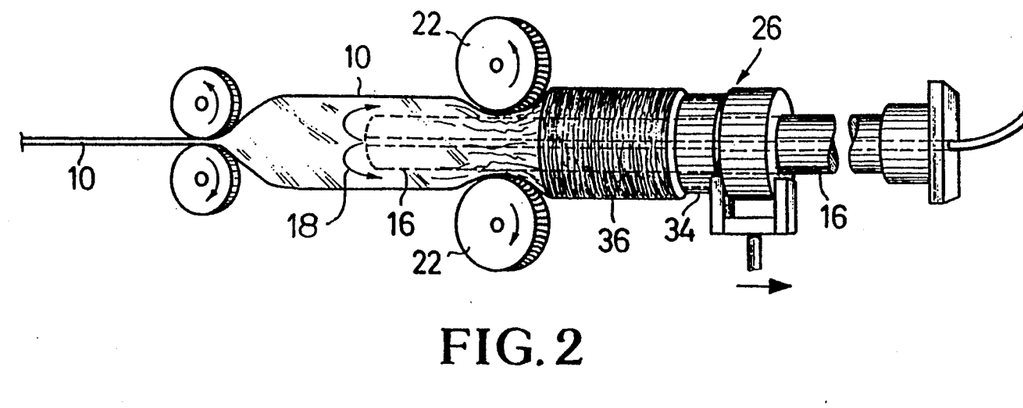
Figure 3:
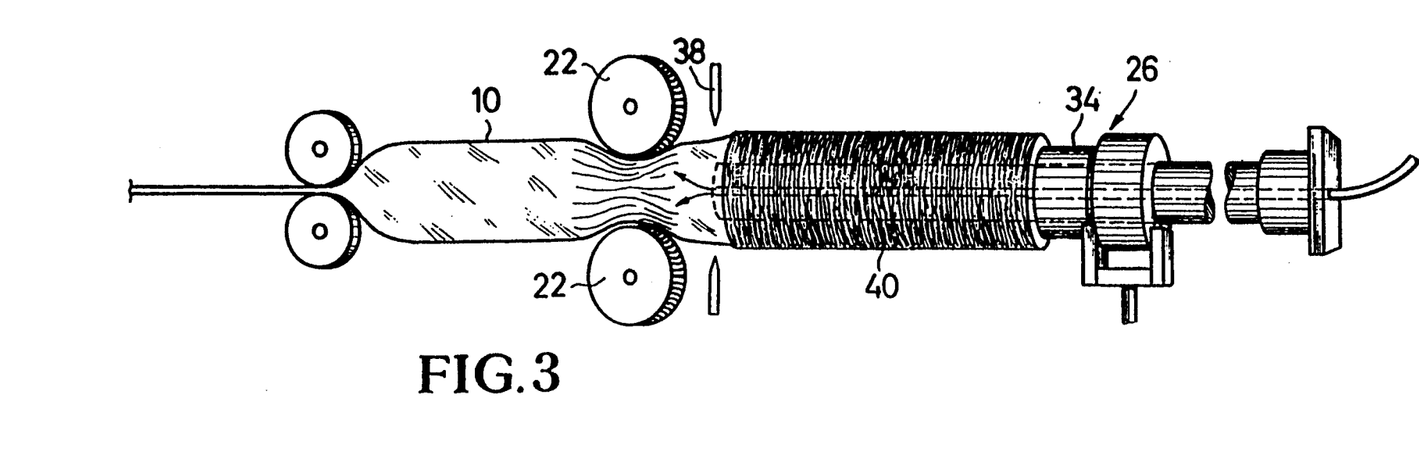

Referring to the drawings, FIGS. 1 to 3 schematically show a conventional shirring mechanism for the manufacture of packing skins shirred to form caterpillars from a hose-type wrapper strand of any desired length. The hose-type wrapper strand 10 emerging from a reel (not shown) in flat condition first passes a pair of pressing rollers 12 which seal the hose-type wrapper. Behind the pair of rollers 12, the hose-type wrapper strand 10 is opened through a shirring tube 16 provided with a bore 14. Inflating air is passed through the bore 14 and, as shown by arrows 18, is blown into the open hose-type wrapper strand 10. The inflated hose-type wrapper strand 10 finally passes a shirring tool 20, schematically shown by two shirring rollers 22, which constricts the inner diameter of hose-type wrapper strand to the shirring tube size and at the same time advances it during rotation thereof.

Shirring tools of the afore-described type are known in the art. In lieu of the two shirring rollers 22 as shown, three or even more shirring rollers can be distributed along the wrapper perimeter. Alternatively other types of shirring tools may be employed, such as a rotatingly actuated internal worm of the type as shown and described, for example, in DE-PS 21 47 498. The type of shirring tools have in common the advance of the hose-type wrapper material for shirring purposes.

FIG. 1 shows the initial position of the hose-type wrapper strand prior to shirring of a new hose-type caterpillar. The crushing rollers 12 and the shirring tool 20, to wit, shirring rollers 22, are in the standstill position. The hose-type wrapper strand 10 extends slightly beyond the shirring rollers where it is held in the open position through the inflating air admitted as shown by arrows 18 at an approximately equal circumferential distance from the shirring tube 16. The shirring tube 16, with the other end thereof, is attached to a holding mechanism 24 shown in FIGS. 1 to 3 in the form of a plate capable of being displaced in the longitudinal direction of the shirring tube 16 through a power cylinder (not shown). In lieu of the plate, the shirring tube may also be attached together with one or several other shirring tubes to an axially displaceable revolver mechanism of the type as shown, for example, by DE-OS 29 24 059.

Displaceably guided on the shirring tube 16 is a stop sleeve 26 exhibiting a cylindrical section 28 tapering toward the shirring tool 20. A collar 30 of greater diameter on the opposite end of the stop sleeve 26 can be seized by a fork-type gripper 32 and displaced, in controlled manner, through the latter by a power cylinder (not shown) along the shirring tube 16.

In the illustration according to FIG. 1 in which the shirring tube 16 is completely pushed into the open end of the hose-type wrapper strand 10, the tapering section 28 of the stop sleeve 26 is positioned immediately ahead of the opening end of the hose-type wrapper strand. Thus, in view of the inflating air centering the strand taper, section 28 can be pushed into wrapper strand 10 to a position directly ahead of the shirring tool 20.

After positioning the shirring rollers 22 (through a drive not shown) are caused to rotate, thereby pushing forwardly the hose-type wrapper material toward the stop sleeve 26. First, an initial section 34 of the hose-type wrapper strand 10 is slid on the tapering section 28 of the stop sleeve 26, the cross-section of which is only irrelevantly smaller than the internal cross-section of the opened hose-type wrapper strand remaining unshirred. Once the front-sided end of the hose-type wrapper strand 10 strikes the collar 30, the hose-type wrapper strand 10 starts to fold itself behind the tapered section 28 of the stop sleeve 26. This forms a hose-type caterpillar 36 growing in proportion to the increasing advance of the hose-type strand, while the stop sleeve 26 at the same time moves to accommodate such a growth in length in a manner controlled by gripper 32.

When finally the desired caterpillar length is reached as shown in FIG. 3, the rotary actuator for the shirring rollers 22 is turned off and the shirring tube 16 with the stop sleeve 26 is moved forwardly a short distance. Then, the caterpillar 36 is separated from the hose-type wrapper strand 10 by a cutter, such as a pair of knives 38 or a rotating cutting disk, to form a shirred packing wrapper 40. The severed packing wrapper 40 on the shirring tube 16, for example with the aid of the aforementioned revolver, can now be placed in a position in laterally staggered relationship to the shirring tool 20.

Figure 4:
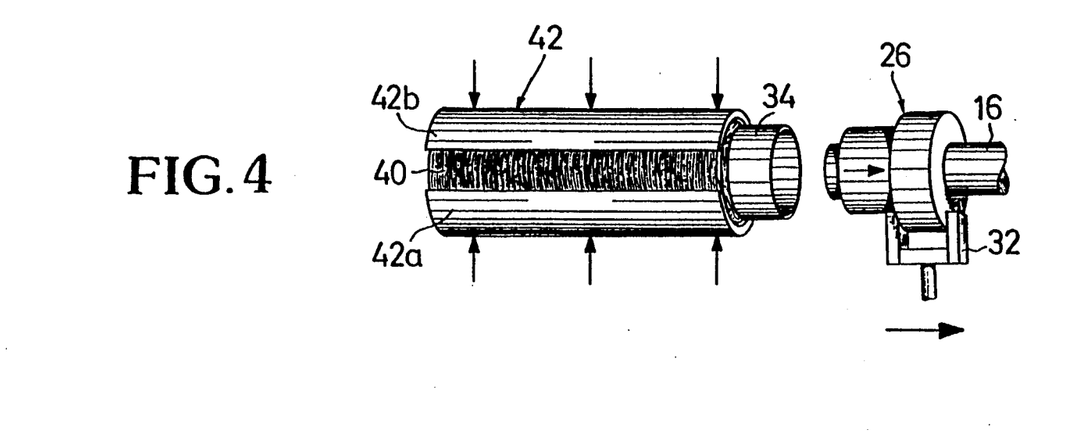

Next, as shown in FIG. 4, packing wrapper 40 is seized by a holding mechanism 42 in a manner that the unshirred hose-type wrapper portion 34 at the front-sided end of the packing wrapper 40 protrudes from the holding mechanism 42. The holding mechanism 42 is composed of two oppositely movable semi-sleeves 42a, 42b which, in the front-sided end, are each provided with a radially inwardly projecting collar 44a and 44b, respectively. Once the semi-sleeves 42a, 42b have engaged the packing wrapper, the stop sleeve 26 and the shirring tube 16 are drawn out of the packing wrapper 40. Then, the holding mechanism 42 with the packing wrapper 40 caught therein is placed ahead of a closing tool to close its front-sided end—as explained hereinafter with reference to FIGS. 5 to 11.

Figures 5, 6:
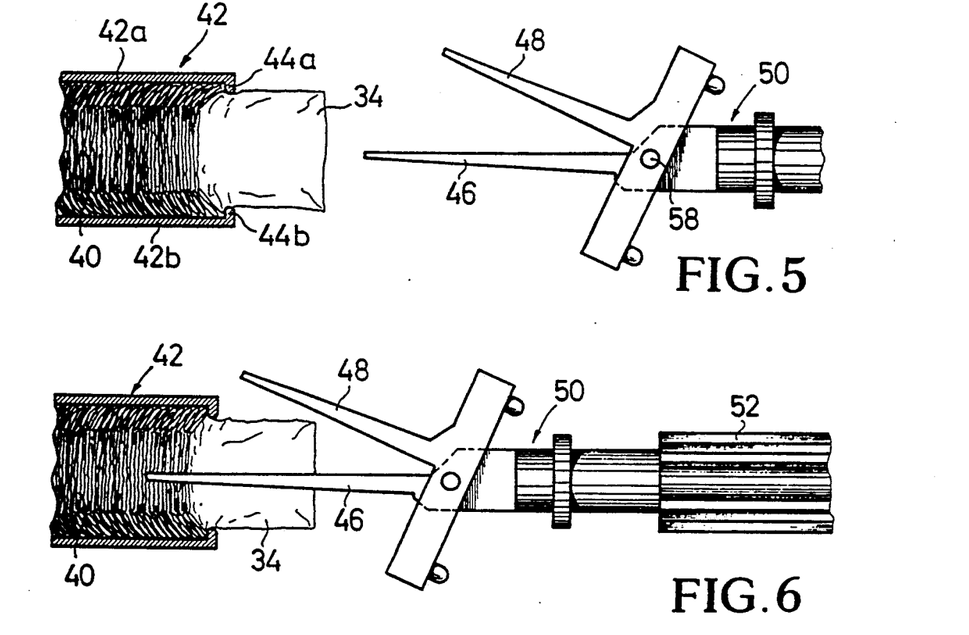
FIGS. 5 to 11 show typical additional states in the form of longitudinal sections during further processing of the packing skin to form the end closure in the form of a twisted plait provided with a vent channel.

FIG. 5 shows the front-sided end of the packing wrapper 40 rigidly clamped within the holding mechanism 42, in longitudinal section, ahead of the closing tool composed of a first winding element 46 in axial alignment with the packing wrapper 40 and a second winding element 48 pivotally hinged thereto. The elements 46, 48 form the elongated, thin legs of a pair of tongs 50 attached to the end of a shaft-type tool carrier 52. The first winding element 46 which is non-pivotable in relation to the tool carrier 52 substantially coincides with the axis of the tool carrier 52 and, hence, with the axis of the packing wrapper 40.

The tool carrier 52 along with the pair of tongs 50 is part of a closure mechanism to be explained in greater detail hereinafter, in conjunction with FIGS. 12 to 16. The axial and rotating movements of the tool carrier as described hereinafter and the opening and closing of the tongs, are generated and controlled with the aid of that mechanism.

In the initial position as shown in FIG. 5, the tongs 50 are in an open position in which the movable tong leg 48 encloses an angle of about 25° to 30° with stationary tong leg 46. In that position of the tong legs, the tool carrier 52 along the axis thereof is moved forwardly toward the packing wrapper 40 clamped onto the holding mechanism 42, thereby causing the stationary leg 46 to move into the packing wrapper 40. Once the free end thereof has penetrated into the folded stock of the packing wrapper 40 (FIG. 6) to a depth of about 5 to 10 mm, the forward movement of the tool carrier 52 is discontinued. The tool carrier 52 is then rotated instead, thereby causing the tongs 50 to close approximately during the first half rotation in a manner to be described hereinafter.

Figure 7:
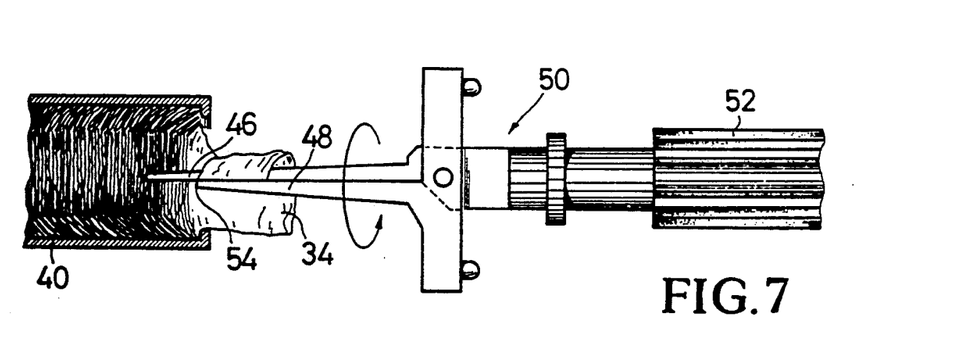

Upon the closure movement of the tongs 50, the movable leg 48 thereof which is of substantially shorter length (e.g., about 12 mm shorter) than the stationary leg 46, seizes the unshirred initial portion 34 of the packing wrapper 40 protruding from the holding mechanism 42 from the outside along a surface line. This causes a folding of the unshirred portion 34 inwardly under simultaneous drive in the circumferential direction, thereby forming a twist off 54, as shown in FIG. 7, of the hose-type material of the initial section 34 at the front-sided end of the tong leg 48. The twist-off 54 forms the beginning of a twisted plait 56. Twisted plait 56 is thus formed by a continuous rotation of tongs 50 (now closed) and, as the advance movement of the tool carrier 52 is recommenced, twisted plait 56 is formed as it travels or builds up along the two tong legs 46, 48 under a continued withdrawal of wrapper material from the fold stock of the packing wrapper 40 toward the tong hinge 58. Simultaneously with the formation of the twisted plait, the unshirred initial section 34 is drawn into the twisted plait 56 to be rigidly enclosed thereby.

Figure 8:
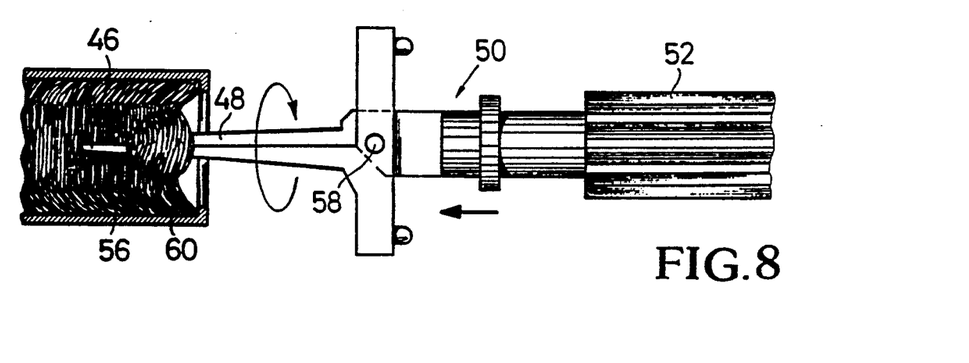

The advance movement of the tongs 50, initially, is relatively rapid. Approximately midway of the distance, the movement is substantially delayed in the manner to be described hereinafter. This causes a reinforced knot 60 to be formed on the outer end of the twisted plait 56, keying itself in the opening end of the packing wrapper (FIG. 8). That condition will be attained, depending on the dimensions of the packing wrapper and the strength of the hose-type material, after about 5 to 10 revolutions of the tongs. At that time, advance movement and rotation of the tongs 50 is stopped.

Figure 9:
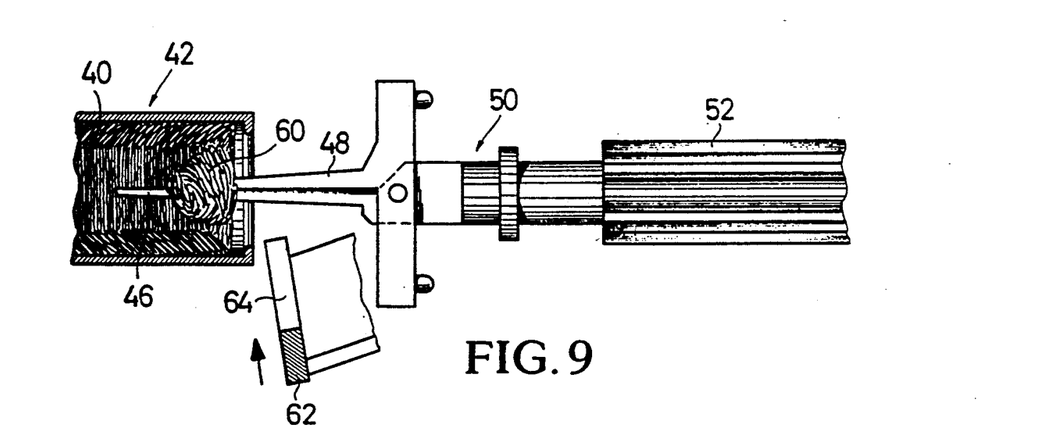
Figure 10:
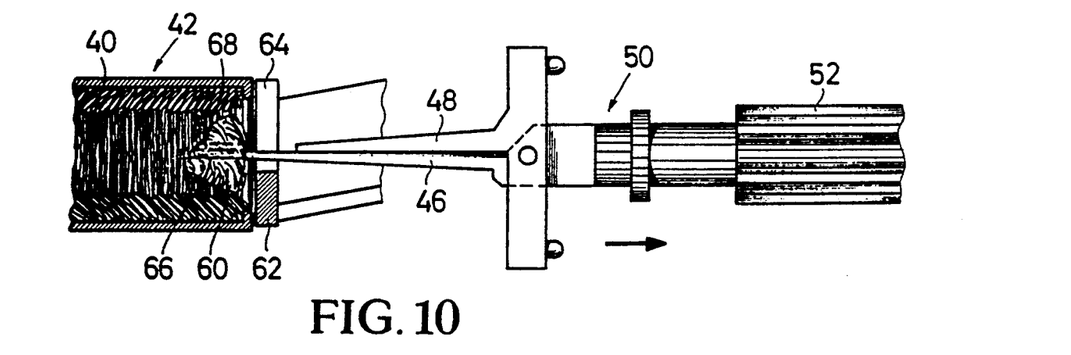

As shown in FIG. 9, a retainer 62 is then moved to a position before the opening end of the holding mechanism 42. The retainer 26 includes a slot 64 of a width such that the tong legs can be accommodated thereby. Once the retainer 62 has reached its end position, the tong legs 46, 48 (whose clamping force upon termination of the tong rotation was reduced) are withdrawn as shown in FIG. 10. This is done by a retraction movement of the tool carrier 52, without rotation, from the twisted plait 56 as twisted plait 56 is prevented by retainer 62 from being also withdrawn. Left in twisted plait 56, as shown in broken lines at 66 and 68, respectively, are two channels. Channel 68 is formed by leg 48 of reduced length and terminates at the afore-mentioned twist-off point 54. However, channel 66 is formed by leg 46 of greater length and is continuously open, thereby forming the desired vent channel within the twisted plait 56.

Figure 11:
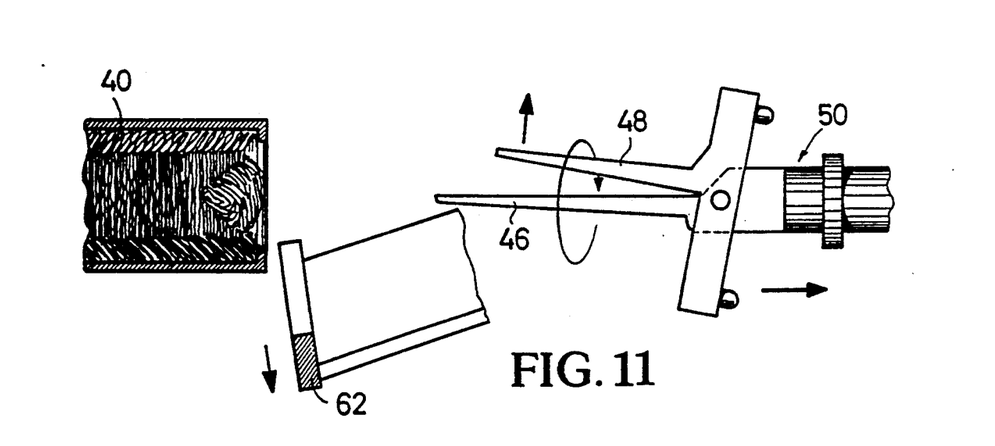

Once the tool carrier 52 with closed tongs 50 according to FIG. 11 has reached its rearward end position, it is rotated temporarily in the opposite direction, thereby causing tongs 50 to open. At the same time, retainer 62 is swivelled back into its resting position, thereby causing all parts to retake their initial position according to FIG. 5 for closing another packing wrapper.

As mentioned before, the tool carrier 52 with tongs 60 and retainer 62 form components of a closure device to be described hereinafter in closer detail in conjunction with FIGS. 12 to 16. The closure means cooperates with a holding mechanism disclosed, for example, by DE-OS 29 26 543, wherein a shirred packing wrapper provided with an unshirred initial section is firmly clamped.

According to FIGS. 12 to 15, the closure mechanism exhibits a housing 70 laterally substantially open. The housing 70 is composed of a base plate 72, two front walls 74 and 76, a cover plate 78, and two narrow lateral bearing plates 80, 82. The bearing plates with the ends thereof, are inserted into recesses of the base plate 72 and the cover plate 78, respectively. The afore-mentioned parts 72 to 82 are interconnected (not shown), as by screws. Secured in the front walls 74, 76 are the ends of two guide rods 84 located at the same level in symmetry with the vertical central longitudinal plane of the housing 70. A sledge-type bridge 88 is mounted on guide rods in a manner longitudinally displaceable with ball sleeves 86. A dual-acting pneumatic power cylinder 90, the housing of which is secured in a bore provided in the rear front wall 76, serves to displace the bridge.

The front-sided wall 74, within a circular, central break-through below the guide rods 84, accommodates a bipartite bearing housing 92 in which is seized the external ring of an anti-friction bearing 94. The internal ring of the anti-friction bearing 94 encloses a sleeve 96 provided with a multiple-spline shaft 98 forming the tool carrier 62. The shaft 98 ends in an axial force transmitting ball bearing 100 which is inserted in an axially non-displaceable manner into a bore 102 of a portion of the bridge 88 extending downwardly and midway between guide rods 84.

The sleeve 96 behind the anti-friction bearing 94 carries a toothed pulley 104. A second toothed pulley 106 along with a counting disk 108 circumferentially provided with fins is seated on the driving shaft 110 of a reversible geared electromotor 112 fixed to the cover plate 78 of the housing 70. A belt 114 is wound about the two pulleys 104, 106, with the belt extending through an opening 116 in the cover plate 78.

The multiple-spline shaft 98, on the front-sided end thereof, contains a threaded bore into which are screwed the tongs 50 with a threaded end 118. The tongs 50 are locked, in suitable manner as by a transverse pin, to prevent them from being unscrewed. The tongs 50 include a shaft-shaped part 120 having the threaded end 118 and having rotatably located thereon a brake drum 122 between a collar 124 rigidly attached to the shaft and a sliding disk 126 of suitable material, such as polytetrafluoroethylene. The sliding disk is supported on the front side, against the multiple-spline shaft 98. The brake drum 122 is clamped, as especially shown in FIGS. 12 and 16, by two brake levers 128, 130 configured as brake jaws and swivably disposed on a bearing sleeve 132. The bearing sleeve 132 is located in a manner to be displaceable in the longitudinal direction on a guide rod 134 on the outer side of the front-sided housing front wall 74. A helical spring 136 loaded between the ends of the brake levers 128, 130 generates the required brake force to form a friction brake for the brake drum 122, slipping once a predetermined torque is exceeded.

The front-sided section 138 of the shaft-type part 120 of tongs 50 is flattened on either side, and at the end thereof carries the stationary leg 46 forming the first winding element. The movable leg 48 forming the second winding element is molded approximately perpendicular to a stretched dual lever 140. The dual lever 140, with a slot 142 contained mid-way therein, is provided on the flattened section 138 of the shaft-type part 120 of tongs 50 and is swivably mounted by a bolt forming the joint 58.

A ring-shaped cam disk 144 secured by screws 146 to the brake drum 122 serves for swivelling the movable tong leg 48. Formed on the free front side of the cam plate 144 are two cams 148, 150 (FIG. 16) respectively extending across half the perimeter. The cams 148, 150 cooperate with a respective cam follower 152, 154 at each end of the dual lever 140 when the shaft 98 with the braked brake drum 122 is turned into one or the other direction. Formed between the ends of the cams 148, 150, by the different axial levels thereof, are stop shoulders 156, 158. The stop shoulders 156, 158 are hit, depending on the direction of rotation of the shaft 98, by one or the other of said cam followers 152 and 154, respectively at the end of its path. The respective cam follower thereby drives, due to the continued rotation of the shaft 98 and in the same direction of rotation, the cam plate 142 with the brake drum 122 under friction slip in relation to the brake levers 128, 130.

The bearing plates 80, 82 by means of articulated pins 160 carry within the housing 70 respectively one leg 162 of a U-shaped damping lever 164. The bridge portion 166 of the damping lever 164, by means of a centrally provided pressure member 168, cooperates with a damping cylinder 170. The damping cylinder 170 is located on the base plate 72 of the housing 70 and is adjustably secured by a clamping socket. The damping cylinder 170 is filled with oil and includes a restoring spring (not shown) forcing the bridge 166, in the resting position, against an angular stop 174 on the base plate 72.

A crossbar 176 is welded between legs 162. The upper end of the legs 162 are reinforced and, with their rounded-off rear edges, form stop faces 178. The stop faces 178 are hit by the bridge 88 during advancing of the tool carrier 52 prior to reaching its front-sided end position, thereby causing a substantial slow-down of the movement of bridge 88 and, hence, of the tongs 50 in the direction of advance.

Figure 12:
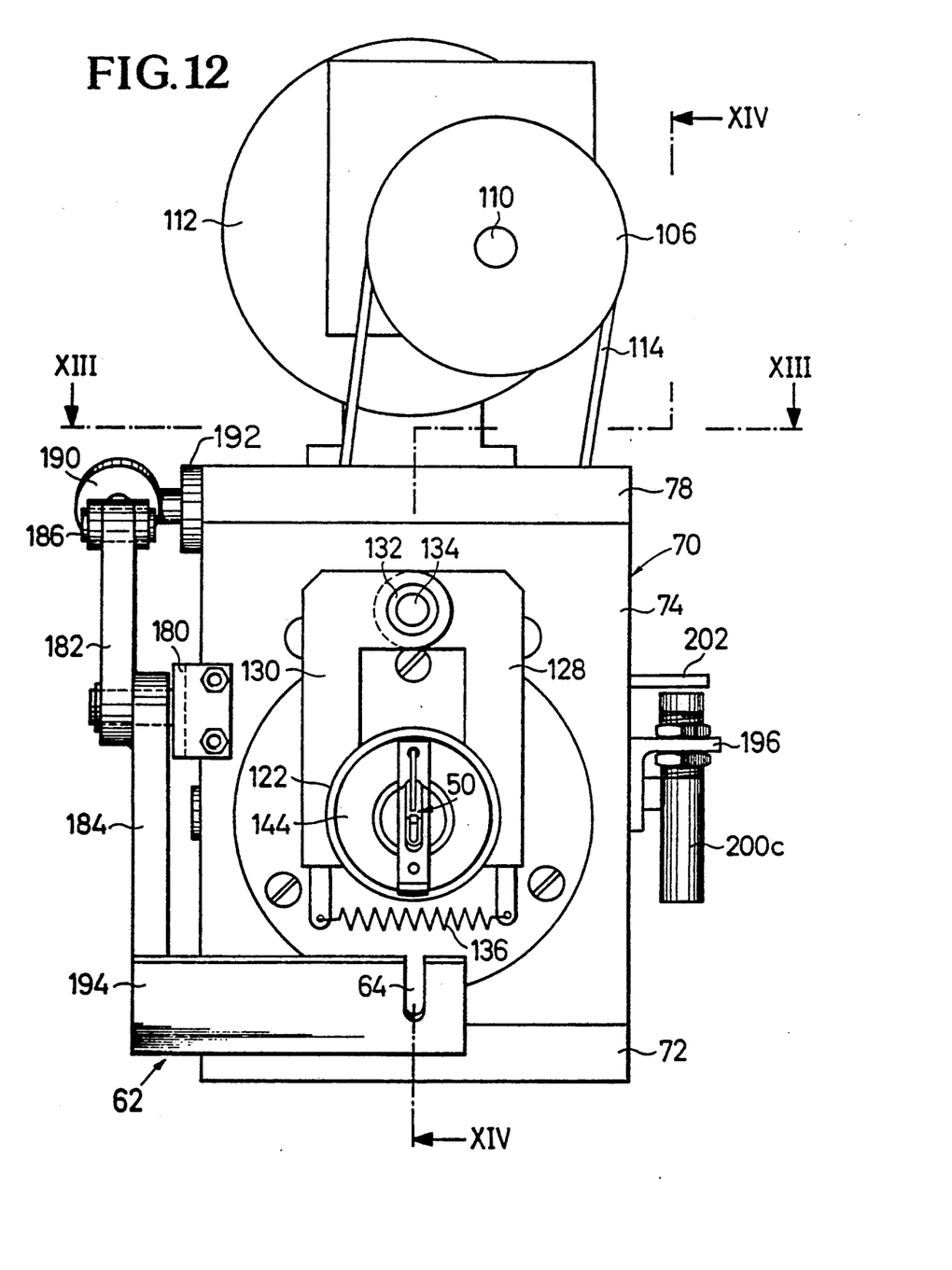
FIG. 12 shows the front side of a device for forming the twisted plait according to FIGS. 5 to 11.
Figure 13:
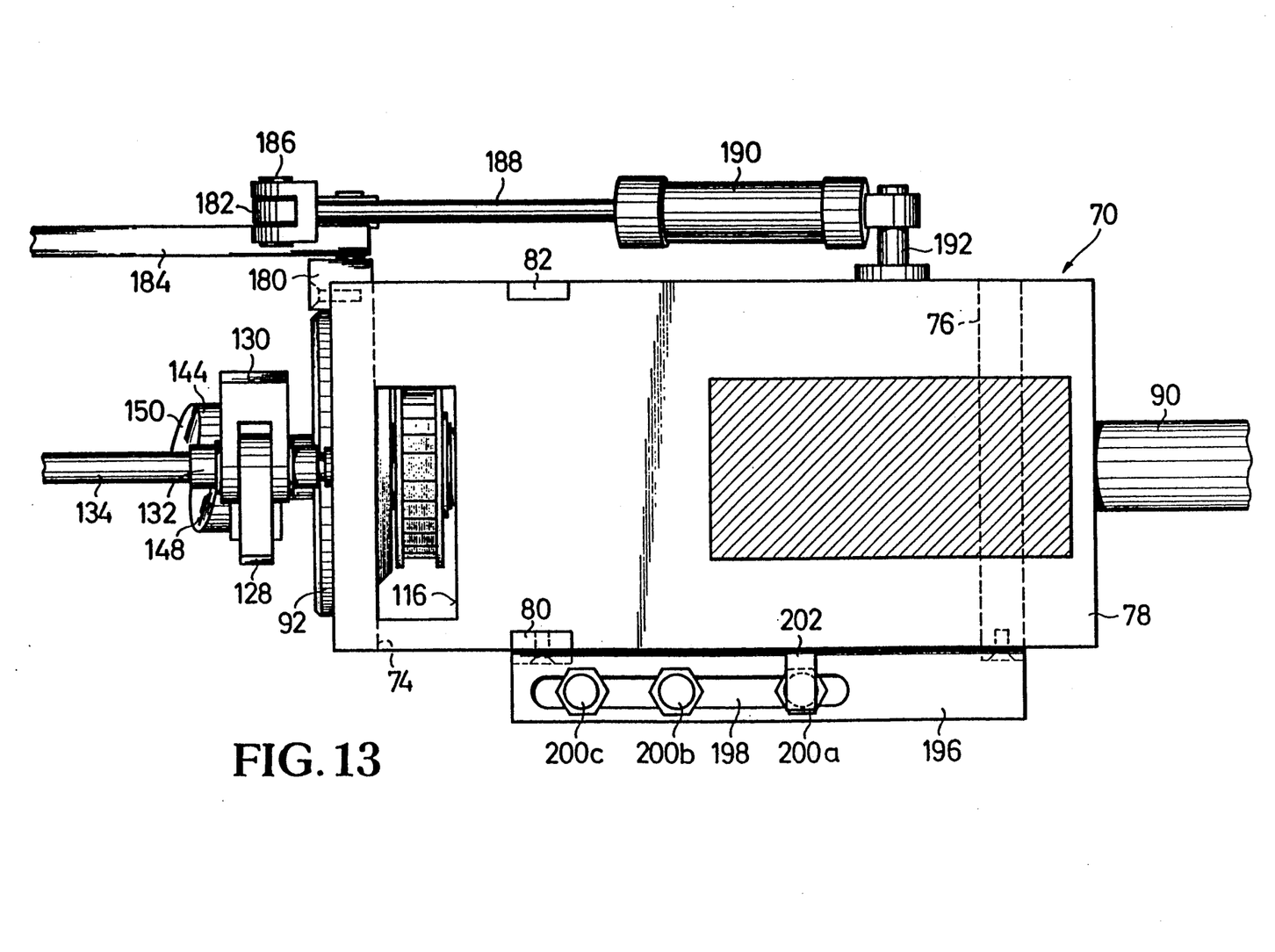
FIG. 13 is a plan view of the device according to FIG. 12 in the plane XIII—XIII in FIG. 12.
Figure 14:
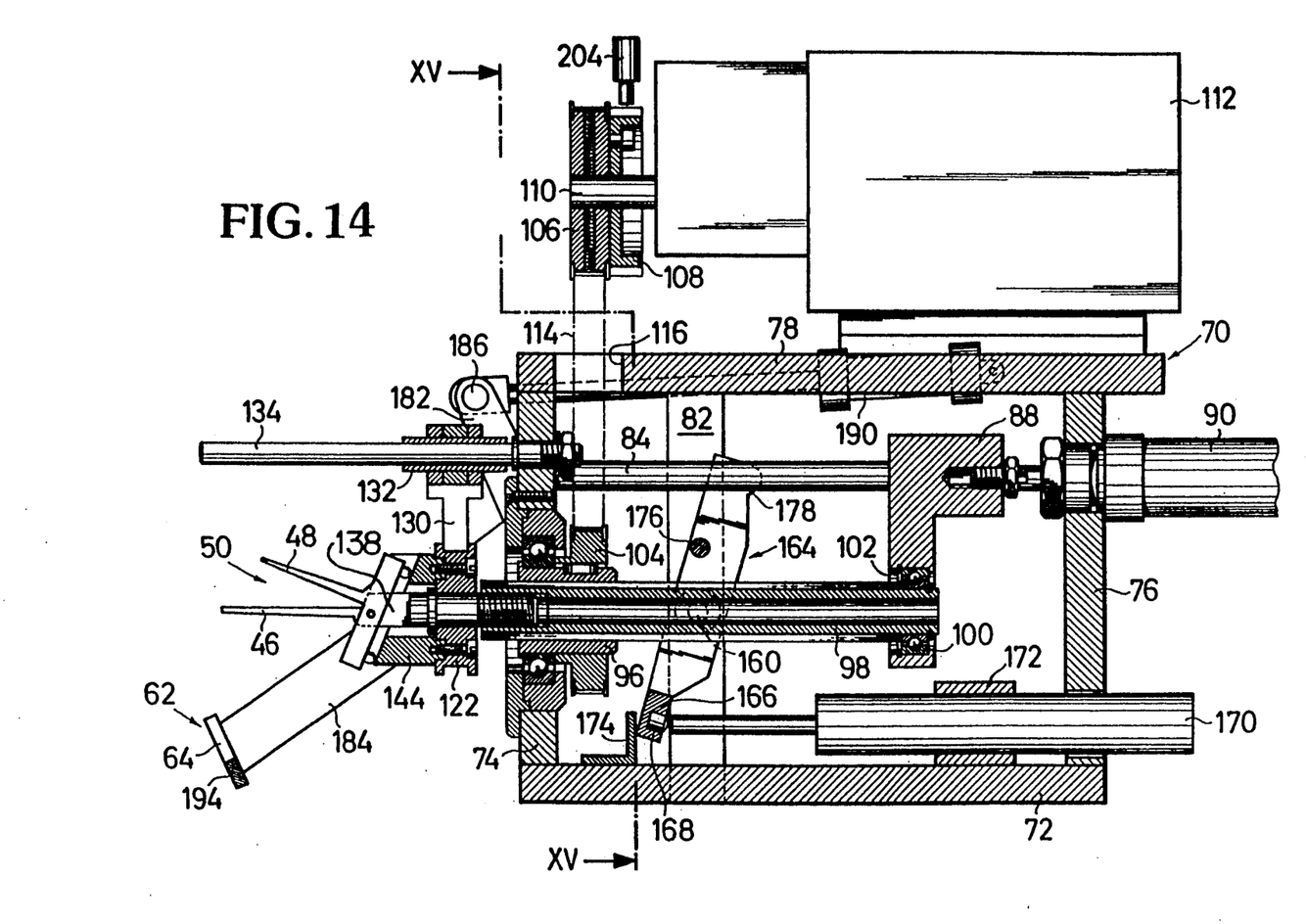
FIG. 14 shows a longitudinal section through the device along line XIV—XIV in FIG. 12.
Figure 14A:
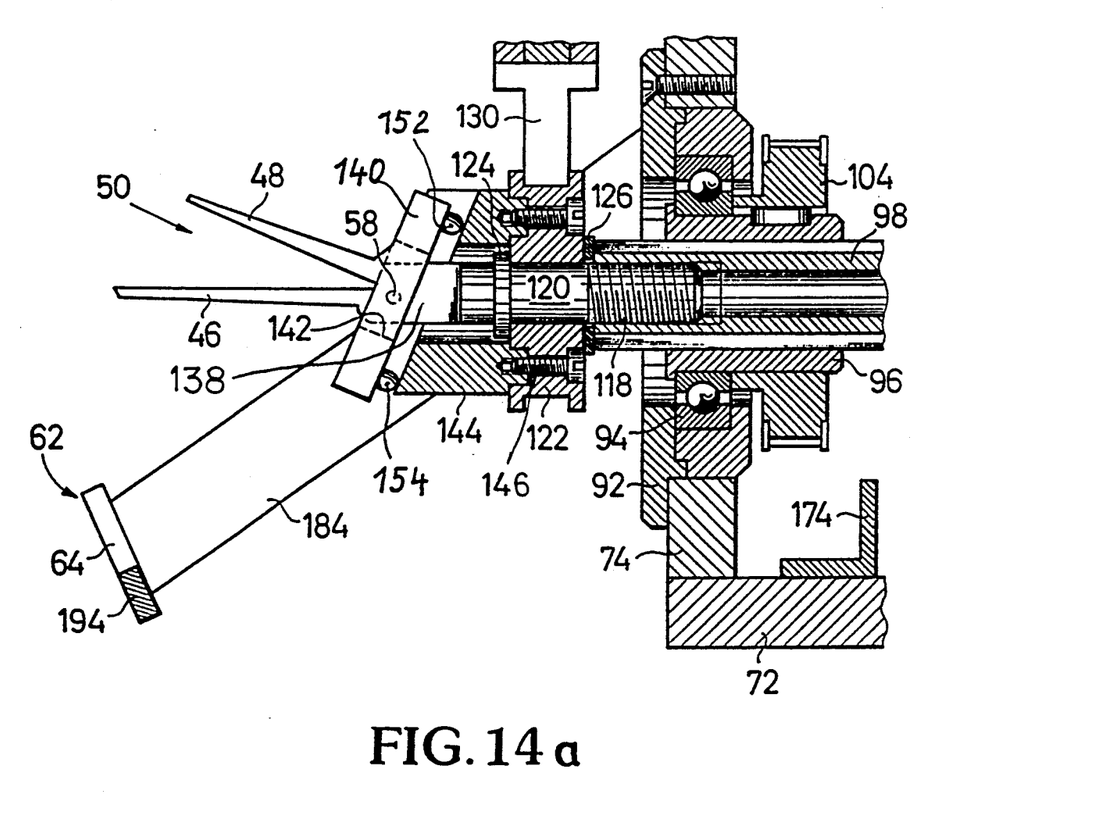
FIG. 14a is a segment from FIG. 14 in enlarged scale.
Figure 15:
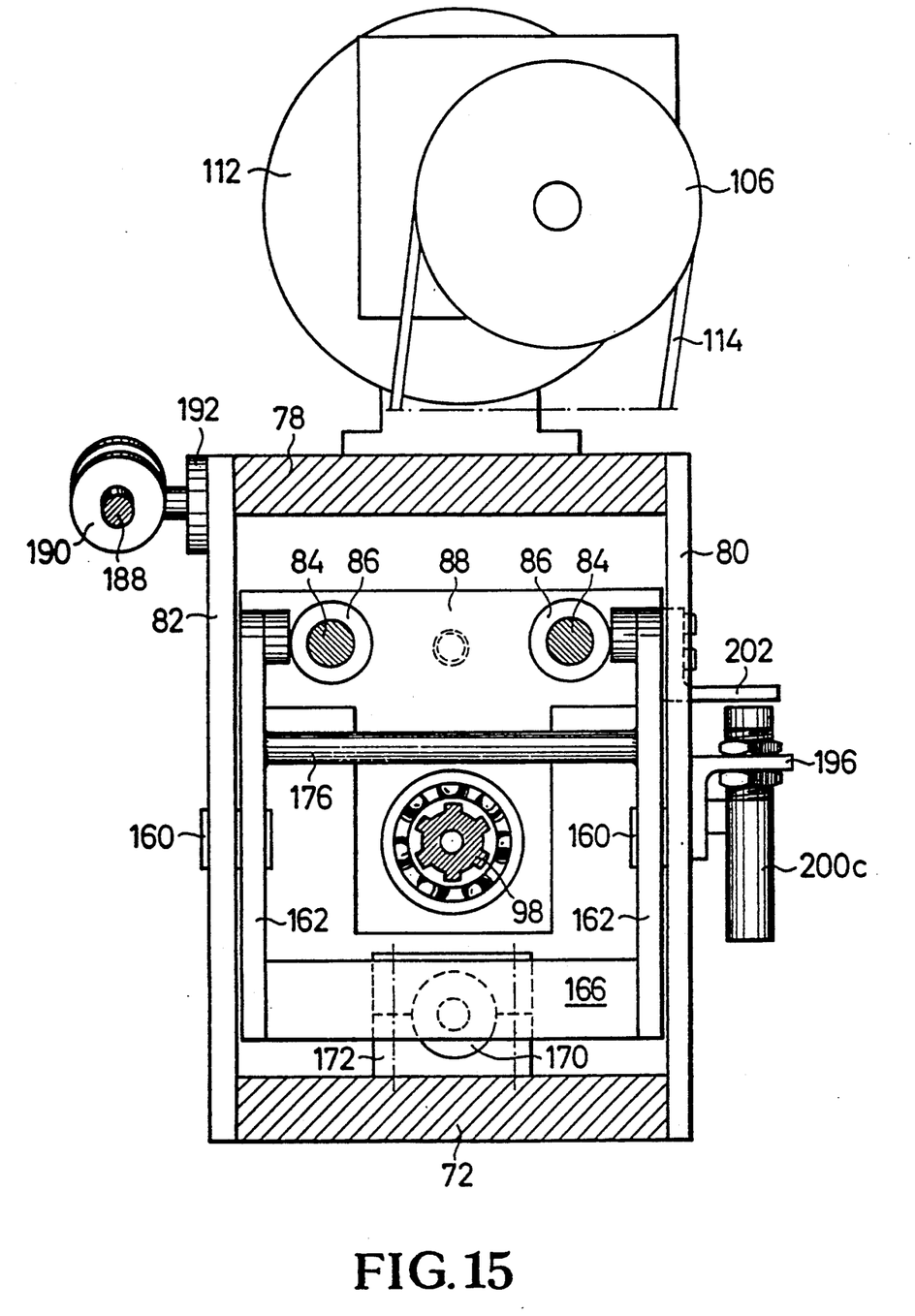
FIG. 15 is a cross-sectional view of the mechanism along line XV—XV in FIG. 14.
Figure 16:
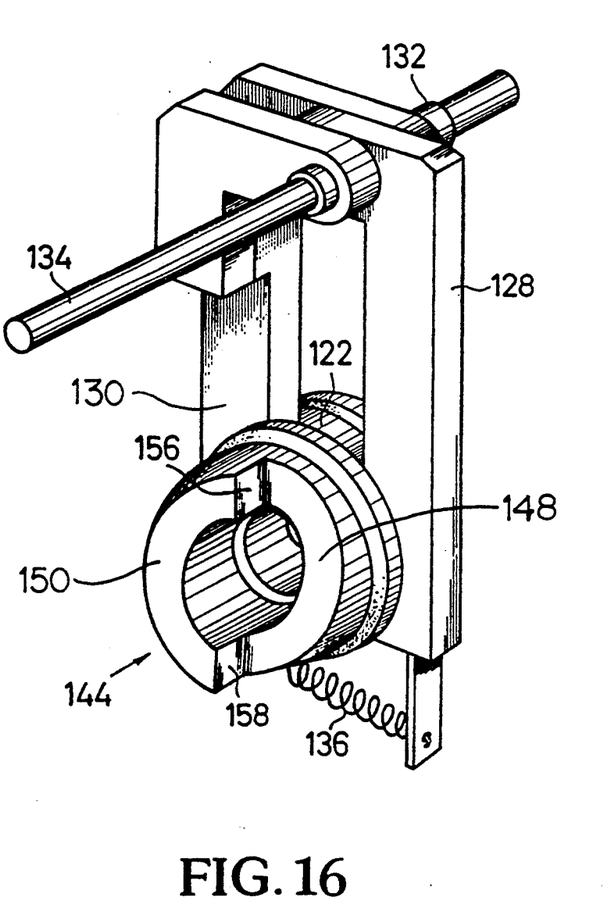
FIG. 16 is a perspective view of a cam disk with a slip brake, and as part of the device.

As shown by FIG. 12, a bearing block 180 is fastened by screws to the left hand edge of the housing front wall or as viewed from the front side. Located on bearing block 180 are two non-rotationally interconnected levers 182, 184. The levers 182, 184 enclose an obtuse angle. The upper lever 182, by an articulated bolt 186, is coupled to the piston rod 188 of a dual-acting power cylinder 190. The housing of power cylinder 190 is pivoted to the cover plate 78 by means of another bearing block 192. The lower lever 184 carries a cross sheet 194 forming the afore-mentioned retainer 62 with the slot 64. By extension and retraction of the power cylinder 190, the cross sheet 194 is swivelled from its resting position shown in FIG. 14 into the operating position shown in FIG. 10 and back into the resting position, respectively.

Figure 17:
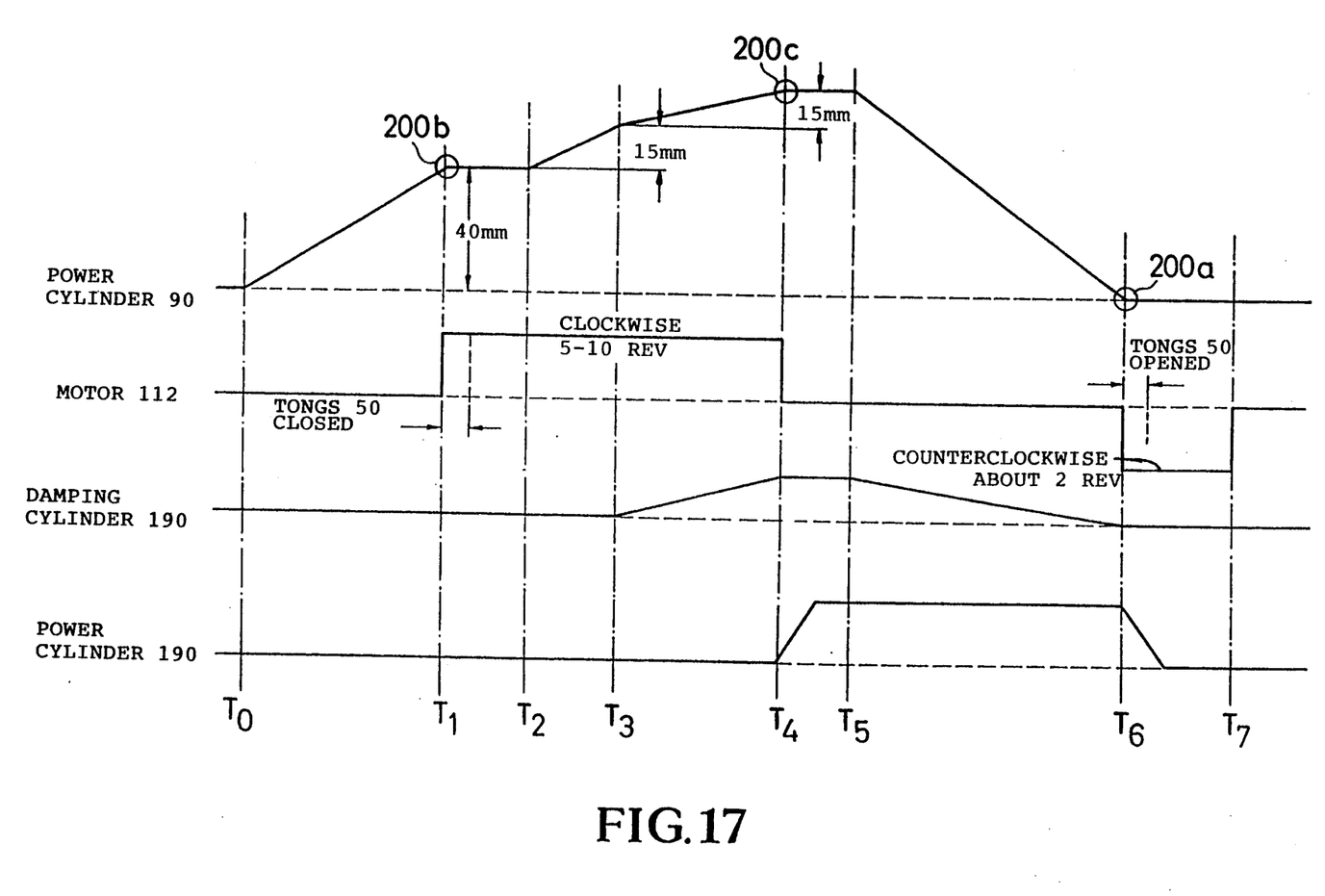
FIG. 17 shows a time diagram to illustrate the timed operation of certain elements of the closure mechanism during forming of the end closure.

Viewed from the front side, an angle section ledge 196 is provided on the right hand side of the housing 70. The ends of ledge 196 are secured to the bearing plate 80 and the rear front wall 76, respectively. The angle section ledge 196, in its horizontal profile leg, contains an oblong aperture 198 for adjustably securing three electrical pulse generators 200a, 200b, 200c. These generators cooperate in contact-free manner with an actuating member 202 fixed to the bridge during its displacement. The counting disk 108 on the driving shaft 110 of the geared motor 122 cooperates, contact-free, with a transmitter (not shown). The pulses of the transmitter as well as the pulses of pulse generators 200a, 200b, 200c are supplied to an electrical control unit (not shown either) to be processed therein. The control unit controls the device according to the time diagram shown in FIG. 17 in the manner described hereinafter to carry out the movements of the tongs 50 for forming the end closure as described with reference to FIGS. 5 to 11.

At the time T$_0$, the device is in its initial position where the power cylinder 90 is retracted and holds the tongs 50 in their retracted position as shown in FIG. 5; motor 112 is switched off; the damping cylinder 170, with the built-in restoring spring, maintains the damping lever 164 in abutment with the stop 174; and the power cylinder 190 is extended so that the retainer 62 takes its resting position. Tongs 50, in that position, are opened.

Once the holding mechanism 42 with a packing wrapper 40 clamped therein is placed ahead of the closure tool, the electrical control unit by a control signal is activated. The control unit switches by means of a control valve, the power cylinder 90 to advance. This thereby forces the bridge 88 on the guide rods 84 forwardly, driving tongs 50 (through the anti-friction bearing 94 and the multiple-spline shaft 98) so that the stationary tong leg 46 moves into the packing wrapper 40 through the unshirred initial part 34. Moreover, the bridge 88 drives the actuator member 202 along the angle ledge 196.

After an advance of, for example, 40 mm, the actuator member 202, at the time $T_1$, reaches the pulse generator 200b. Pulse generator 200b then transmits to the control unit a pulse turning off the advance movement of the power cylinder 90. Hence, the position of tongs 50 according to FIG. 6 has been reached.

At the same time $T_1$ that the feed movement is stopped, the motor 112 is turned clockwise, closing by its first half rotation tongs 50 (FIG. 7). The control unit counts the rotational angle pulses generated by the transmitter 204 in cooperation with the rotating counting disk 108 and switches on again the feed movement of the power cylinder 90 at time $T_2$ after about 1.5 revolutions. This forms the twisted plait 56 on the tong legs 46, 48. The feed movement at first is undamped so that the twisted plait 56 migrates relatively quickly along the tong legs toward the tong joint 56. At $T_3$, however, the bridge 88 strikes the damping lever 164 and the feed movement is slowed down by the damping cylinder 170 so that knot 60 is formed on the twisted plait 56 (FIG. 8) as described in the aforegoing.

At the time $T_4$, the actuating member 202 reaches the pulse generator 200c, thereby switching off the feed movement of the power cylinder 90. At the same time, the electromotor 112 is rendered inoperative while the power cylinder 190 is actuated in the retracting direction thereby swivelling the retainer 62 to a position in front of the packing wrapper 40 (FIG. 9).

Upon lapse of a predetermined period of time, through a time member in the control unit, at the time $T_5$ the power cylinder 90 is switched over to the retraction direction. This causes a withdrawal of the tong legs 46, 48 out of the twisted plait 56 which twisted plait is prevented by the retainer 62 from being also withdrawn. At the same time, the built-in restoring spring of the damping cylinder 170 swivels the damping lever 164 into the stop position against the stop 174. It should be appreciated that this is done slowly in view of the oil damping of damping cylinder 170.

At the time $T_6$, the actuating member 202 reaches the pulse generator 200a, causing the power cylinder 90 to be switched off. At the same time, the electromotor 112 is switched to an anti-clockwise run with the result that the braked cam plate 144 opens tongs 50. After two revolutions at most (whereafter opening of the tongs is, in fact, safeguarded), the motor 112 is turned off at time $T_7$ so that the mechanism has reached its initial position.

The hose-type wrapper with the end closure formed therein can now be released by the holding mechanism 42 to be fed to a store rack to make room for a new packing wrapper having an unshirred initial section.

I claim:

1. A method for forming a vent hole in a twisted plait of a hose-type packing wrapper such as a sausage skin which has been shirred to form a caterpillar comprising the steps of:

forming on an end of a shirred section of the packing wrapper to be closed an unshirred wrapper section extending axially outside of the shirred section;

introducing a first elongated winding element through the unshirred wrapper section into the shirred section;

seizing the unshirred wrapper section along an axial portion thereof with a second elongated winding element which moves in a radial direction toward the first winding element, the second winding element having a length less than the first winding element;

rotating the winding elements relative to the shirred section to form the twisted plait;

advancing the winding elements during the rotating step into the shirred section such that the twisted plait is generated within the shirred section in a manner progressing from a free end of the second winding element rearwardly; and withdrawing of the winding elements from the shirred section and the twisted plait whereby the vent hole is formed by an opening left by the withdrawing of the first winding element.

2. A method for forming a vent hole as claimed in claim 1 wherein said seizing step includes the step of clamping the unshirred wrapper section to the first winding element by movement of the second winding element.

3. A method for forming a vent hole as claimed in claim 2 and further including the step of relaxing a clamping force of the second winding element on the first winding element after said rotating step.

4. A method for forming a vent hole as claimed in claim 1 wherein said seizing step includes an initial rotating of the winding elements which causes a suitable actuating means to move the second winding element toward the first winding element.

5. A method for forming a vent hole as claimed in claim 4 wherein said advancing step is performed only after the initial rotating step.

6. A method for forming a vent hole as claimed in claim 1 wherein said forming step includes the step of commencing the shirring of the packing wrapper at a distance from the end of the packing wrapper.

7. An apparatus for forming a vent hole in a twisted plait of a hose-type packing wrapper such as a sausage skin which has been shirred to form a caterpillar comprising:

a holding means for holding a shirred section in position with an unshirred wrapper section extending outside of the shirred section along an axial axis thereof;

an elongate tool carrier having a longitudinal axis in alignment with the axial axis of the shirred section, said tool carrier including (a) a pair of tongs located at an end of said tool carrier adjacent said holding means, said pair of tongs having a first leg which is rigidly connected to said tool carrier in alignment with the longitudinal axis thereof and a second leg which is shorter than said first leg, and (b) a leg moving means for moving said second leg radially toward said first leg; and a rotating and displacing means for rotating and displacing said tool carrier in a controlled manner axially of the shirred section held by said holding means whereby the twisted plait is formed by a clamping of the unshirred wrapper section between said legs and the subsequent simultaneous rotation and advancement of the legs into the shirred section and the vent hole is formed by the withdrawal of the first leg from the formed twisted plait.

8. An apparatus for forming a vent hole as claimed in claim 7 wherein said pair of tongs is made of steel and said legs are titanium coated.

9. An apparatus for forming a vent hole as claimed in claim 7 wherein said second leg is pivotally mounted to said first leg; and wherein said leg moving means includes a cam means for converting a first portion of the rotation of said tool carrier by said rotating and displacing means to a radial movement of said second leg towards said first leg and for rotating with said tool carrier thereafter.

10. An apparatus for forming a vent hole as claimed in claim 9 wherein said cam means includes a cam follower mounted to said second leg, a cam surface about the longitudinal axis of said tool carrier, a slip brake means for initially holding said cam surface against rotation, and a stop on said cam surface for engaging said cam follower after the first portion of the rotation.

11. An apparatus for forming a vent hole as claimed in claim 9 wherein said cam means includes a two-armed lever attached to a rear end of said second leg, a respective cam follower at each end of said two-armed lever, and a pair of cam surfaces each extending 180° about the longitudinal axis of said tool carrier which are engaged by a respective cam follower.

12. An apparatus for forming a vent hole as claimed in claim 11 wherein said cam means further includes a drum rotatably mounted on said tool carrier on which said cam surfaces are provided, and a pair of brake levers which are resiliently biased into engagement with said drum to brake the rotational movement of said drum.

13. An apparatus for forming a vent hole as claimed in claim 7 wherein said tool carrier further includes a stationary housing, a multiple spline shaft, and a shaft mounting means for mounting said shaft in an axially displaceable manner within said housing; and wherein said rotating and displacing means includes a shaft moving means for reciprocally moving said shaft axially toward and away from said holding means.

14. An apparatus for forming a vent hole as claimed in claim 13 wherein said shaft mounting means includes a driving sleeve in which said shaft extends in an axially movable and irrotational manner; and wherein said rotating and displacing means includes a sleeve rotating means for rotating said driving sleeve.

15. An apparatus for forming a vent hole as claimed in claim 13 wherein said shaft moving means includes guide rods disposed axially in said housing, a bridge mounted for axial movement on said guide rods and coupled to said shaft, and a power cylinder mounted to said housing and said bridge and being disposed axially parallel to the longitudinal axis of said tool carrier such that dual actuation of said power cylinder causes the reciprocal movement of said shaft.

16. An apparatus for forming a vent hole as claimed in claim 15 wherein said shaft moving means further includes a damping means which engages said bridge for damping the final portion of the movement of said shaft toward said holding means caused by said shaft moving means.

17. An apparatus for forming a vent hole as claimed in claim 14 wherein said tool carrier further includes a plurality of electrical pulse generators, and an actuator member mounted on said bridge which cooperates in a contact free manner with said electrical pulse generators as said bridge moves to control the actuation of said shaft moving means and said sleeve rotating means.

18. An apparatus for forming a vent hole as claimed in claim 7 wherein said tool carrier further includes a stationary housing, a retaining lever pivotally mounted to said housing and including a recess therein, and a lever moving means for moving said retaining lever at an end of an advance movement of said tool carrier to a position in front of the formed twisted plait with the legs received in said recess such that as said legs are withdrawn from the twisted plait said retaining lever holds the twisted plait in place in said shirred section.

* * * * *